C. C. McDANIEL.
ADJUSTABLE WASHSTAND.
APPLICATION FILED FEB. 21, 1919.
1,335,446.
Patented Mar. 30, 1920.
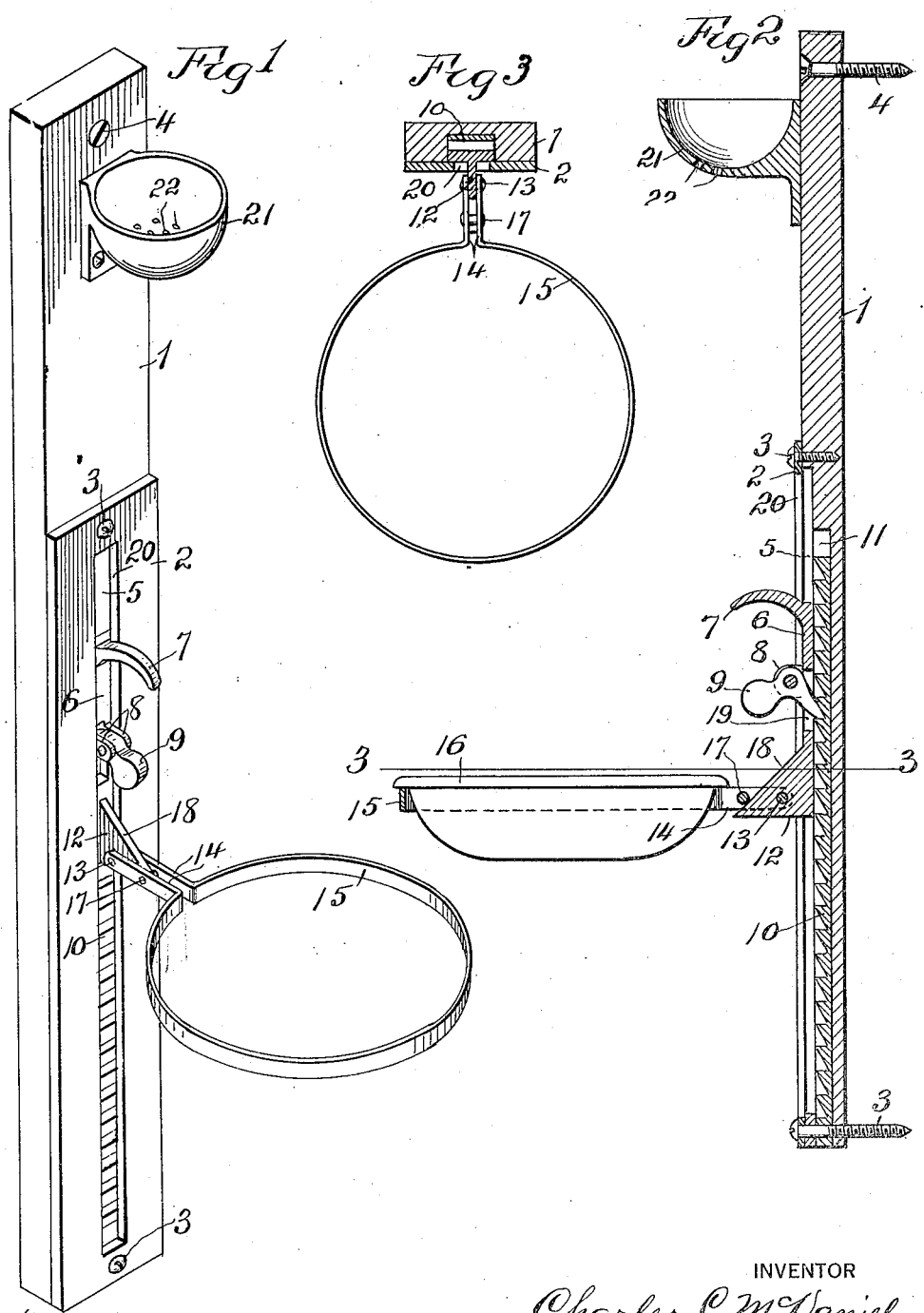
INVENTOR
Charles C. McDaniel
BY
Warren D. House
His ATTORNEY
Witness:
R. E. Hamilton

UNITED STATES PATENT OFFICE.

CHARLES C. McDANIEL, OF WESTPHALIA, KANSAS.

ADJUSTABLE WASHSTAND.

1,335,446. Specification of Letters Patent. Patented Mar. 30, 1920.

Application filed February 21, 1919. Serial No. 278,440.

*To all whom it may concern:*

Be it known that I, CHARLES C. McDANIEL, a citizen of the United States, residing at Westphalia, in the county of Anderson and State of Kansas, have invented a certain new and useful Improvement in Adjustable Washstands, of which the following is a specification.

My invention relates to improvements in adjustable wash stands.

The object of my invention is to provide a novel wash stand which is provided with means for vertically adjusting a wash bowl which the stand is adapted to carry. A further object of my invention is to provide a wash stand having bowl supporting means which is adapted to be swung from a horizontal position to an upright position so as to conserve space when the bowl is removed and the stand is not in use.

My invention provides still further an adjustable wash stand which is ornamental, which may be readily attached to a wall, which is simple in construction, cheap to manufacture, durable, not liable to get out of order, and which may be easily operated in adjusting a wash bowl to different heights.

The novel features of my invention are hereinafter fully described and claimed.

In the accompanying drawing, which illustrates the preferred embodiment of my invention, Figure 1 is a perspective view of my improved wash stand showing the bowl removed and the bowl supporting member disposed in the horizontal position.

Fig. 2 is a central vertical sectional view of the stand showing a wash bowl mounted in the bowl supporting member.

Fig. 3 is a horizontal sectional view on the line 3—3 of Fig. 2, the bowl being removed.

Similar reference characters designate similar parts in the different views.

1 designates a base member comprising, preferably, a board to the forward side of which is fastened the plate 2, which is secured to the board 1 by screws 3, one of said screws being adapted to be inserted in the wall to which the base member 1 is attached by the lower screw 3 and by a screw 4.

5 designates a longtitudinal groove in the front of the base member 1 at the rear of the plate 2, having slidably mounted therein a supporting member comprising a plate 6 having at its upper end a projecting hand hold 7 and provided with two ears 8, between which is pivoted on a horizontal axis a pawl 9 which engages the toothed forward side of a vertical member 10, which is secured to the base member 1 in a deepened portion 11 of the groove 5.

The member 6 is provided at its forward side with an extension 12, to which is pivoted by a transverse pin 13 the two lateral arms 14 of a ring bowl supporting member 15, which is adapted to support a removable bowl 16.

A pin 17 extends transversely through the arms 14 and is adapted to rest upon the inclined forward edge 18 of the extension 12, for supporting the bowl supporting member 15, in the horizontal position shown in the drawing.

The pawl 9 extends through a slot 19 in the supporting member 6 and also through a vertical slot 20 with which the plate 2 is provided and through which extends the hand hold 7, ears 8 and extension 12.

21 designates a soap container, which is attached to the base member 1 above the limit of movement of the bowl 16, which is so located as to receive drippings from perforations 22 provided in the lower side of the soap container 21.

The projecting portion of the pawl 9 may serve as a finger hold, which is adapted to be simultaneously grasped with the hand hold 7 by one hand of the operator. It may also serve as a weight for forcing the pawl normally into engagement with the toothed member 10.

In the operation of my invention, to vertically adjust the member 6, it is lifted by the hand hold 7, the pawl 9 slipping over the teeth of the member 10, and engaging the latter when the hand hold 7 is released. To lower the member 6, the hand hold 7 may be lifted with one finger and the pawl 9 disengaged with another finger of the same hand, to permit the member 6 being lowered to the desired position.

When the bowl 16 is removed, the bowl supporting member 15 may be swung to an upright position, where it will not project into the room, thus conserving room space.

I do not limit my invention to the structure shown and described, as modifications, within the scope of the appended claims, may be made without departing from the spirit of my invention.

What I claim is:—

1. In an adjustable wash stand, a supporting member, a vertical toothed member attached thereto, a vertical plate secured to said supporting member and covering the toothed member and having a vertical slot, a vertically slidable member guided by and between said supporting member and said plate and having an extension and an ear extending through said slot, a pawl pivoted to said ear and extending through said slot and engaging said toothed member, and wash-bowl supporting means carried by said extension.

2. In an adjustable wash stand, a supporting member, a vertical toothed member attached thereto, a vertical plate secured to said supporting member and covering the toothed member and having a vertical slot, a vertically slidable member guided by and between said supporting member and said plate and having an extension extending through said slot, a pawl pivoted to said slidable member and extending through said slot and engaging said toothed member, and a wash bowl supporting member pivoted to said extension and arranged to be supported thereby in a horizontal position and in an upright position.

In testimony whereof I have signed my name to this specification.

CHARLES C. McDANIEL.